(12) United States Patent
Chen et al.

(10) Patent No.: US 9,742,573 B2
(45) Date of Patent: Aug. 22, 2017

(54) METHOD AND APPARATUS FOR CALIBRATING MULTIPLE MICROPHONES

(71) Applicant: Cisco Technology, Inc., San Jose, CA (US)

(72) Inventors: Wei (Wilson) Chen, Hangzhou Zhejiang (CH); Hui (Alina) Wu, Jiangsu (CH); Mark Thomas Oden, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 227 days.

(21) Appl. No.: 14/066,611

(22) Filed: Oct. 29, 2013

(65) Prior Publication Data

US 2015/0117671 A1    Apr. 30, 2015

(51) Int. Cl.
| | |
|---|---|
| *H04L 12/18* | (2006.01) |
| *H04M 3/56* | (2006.01) |
| *H04R 3/00* | (2006.01) |
| *H04R 27/00* | (2006.01) |

(52) U.S. Cl.
CPC ...... *H04L 12/1813* (2013.01); *H04L 12/1827* (2013.01); *H04M 3/56* (2013.01); *H04M 3/568* (2013.01); *H04R 3/00* (2013.01); *H04R 27/00* (2013.01); *H04R 2410/00* (2013.01)

(58) Field of Classification Search
CPC ........ H04L 12/1813; H04R 3/00; H04R 3/005
USPC ....... 381/92, 26, 71.1; 375/285; 379/202.01, 379/430; 455/416; 704/226, 231, 233, 704/275; 715/716
See application file for complete search history.

(56) References Cited

U.S. PATENT DOCUMENTS

| | | | | |
|---|---|---|---|---|
| 5,561,737 | A * | 10/1996 | Bowen .................... | H04M 3/56 379/206.01 |
| 5,625,697 | A * | 4/1997 | Bowen .................... | H04M 9/08 367/126 |
| 5,844,994 | A | 12/1998 | Graumann | |
| 6,173,059 | B1 * | 1/2001 | Huang ................... | H04R 1/406 379/202.01 |
| 6,717,991 | B1 * | 4/2004 | Gustafsson ............ | H04R 3/005 375/285 |
| 7,916,849 | B2 * | 3/2011 | Bathurst et al. ......... | 379/202.01 |
| 8,363,823 | B1 * | 1/2013 | Santos ................. | H04R 1/1041 379/430 |
| 8,411,880 | B2 * | 4/2013 | Wang ....................... | H03G 3/32 381/122 |
| 8,543,390 | B2 * | 9/2013 | Nongpiur et al. ............ | 704/226 |
| 8,606,249 | B1 * | 12/2013 | Goodwin ................ | H04B 3/20 370/261 |
| 8,687,820 | B2 * | 4/2014 | Truong et al. .................. | 381/92 |
| 9,294,834 | B2 * | 3/2016 | Liu ........................ | H04M 1/19 |

(Continued)

*Primary Examiner* — Gerald Gauthier
(74) *Attorney, Agent, or Firm* — P. Su (57) ABSTRACT

In one embodiment, a method includes capturing sound using a plurality of microphones, wherein the plurality of microphones is associated with a computing system. The method also includes determining energy levels for the plurality of microphones, and determining signal-to-noise ratios (SNRs) for the plurality of microphones. Finally, the method includes selecting a particular microphone of the plurality of microphones based on the energy levels and the SNRs, wherein selecting the particular microphone includes providing audio signals obtained by the particular microphone to the computing system for use.

20 Claims, 8 Drawing Sheets

(56) References Cited

U.S. PATENT DOCUMENTS

| | | | |
|---|---|---|---|
| 2003/0076965 A1 | 4/2003 | Janse et al. | |
| 2004/0161121 A1* | 8/2004 | Chol | G10L 21/0208 381/92 |
| 2005/0060148 A1* | 3/2005 | Masuda | G10L 17/00 704/231 |
| 2005/0071158 A1* | 3/2005 | Byford | G10L 25/78 704/233 |
| 2005/0286696 A1* | 12/2005 | Bathurst | H04M 9/082 379/202.01 |
| 2006/0032357 A1 | 2/2006 | Roovers et al. | |
| 2006/0222184 A1* | 10/2006 | Buck | G10L 21/0208 381/71.1 |
| 2008/0170717 A1* | 7/2008 | Liu | G01S 5/30 381/92 |
| 2009/0002476 A1* | 1/2009 | Cutler | 348/14.01 |
| 2009/0196429 A1* | 8/2009 | Ramakrishnan | H04R 3/005 381/26 |
| 2009/0238377 A1* | 9/2009 | Ramakrishnan et al. | 381/92 |
| 2010/0092007 A1* | 4/2010 | Sun | G10L 25/00 381/92 |
| 2010/0111324 A1 | 5/2010 | Yeldener et al. | |
| 2011/0051953 A1 | 3/2011 | Makinen et al. | |
| 2011/0058683 A1* | 3/2011 | Kosteva | H04R 3/005 381/92 |
| 2012/0020485 A1 | 1/2012 | Visser et al. | |
| 2012/0224715 A1* | 9/2012 | Kikkeri | H04R 3/005 381/92 |
| 2012/0284619 A1* | 11/2012 | Myllyla | H04R 29/008 715/716 |
| 2013/0030803 A1* | 1/2013 | Liao | G10L 15/20 704/233 |
| 2014/0270245 A1* | 9/2014 | Elko et al. | 381/92 |
| 2015/0117671 A1* | 4/2015 | Chen | H04L 12/1813 381/92 |
| 2015/0317999 A1* | 11/2015 | Gao | H04R 1/00 704/226 |
| 2016/0261951 A1* | 9/2016 | Matheja | G10L 21/0232 |

* cited by examiner

METHOD AND APPARATUS FOR CALIBRATING MULTIPLE MICROPHONES

TECHNICAL FIELD

The disclosure relates generally to computing systems used to participate in voice communications. More particularly, the disclosure relates to automatically selecting a microphone from a plurality of microphones associated with a computing system for use in voice communications.

BACKGROUND

Many computing systems, e.g., personal computing systems such as laptop or desktop computers, have more than one associated microphone. By way of example, a computer may be connected to a headset which has a microphone and a webcam which also has a microphone.

When a user participates in voice communications, e.g., a conference call or a web conference, using a computer with more than one associated microphone, the microphone used to capture the voice of the user may not be the best microphone to use. By way of example, if a microphone in a webcam is configured as the "default" microphone for use with the computer, the microphone in the webcam will be used to capture the voice of the user even if the microphone in the webcam is associated with more noise than a microphone in a headset.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

According to one aspect, a method includes capturing sound using a plurality of microphones, wherein the plurality of microphones is associated with a computing system. The method also includes determining energy levels for the plurality of microphones, and determining signal-to-noise ratios (SNRs) for the plurality of microphones. Finally, the method includes selecting a particular microphone of the plurality of microphones based on the energy levels and the SNRs, wherein selecting the particular microphone includes providing audio signals obtained by the particular microphone to the computing system for use.

Description

Many computing systems have more than one associated microphone. By way of example, a computer system may be communicably connected to a webcam and to a headset, each of which have a microphone. Typically, a default microphone may be selected by a user for use to obtain audio signals and to provide the audio signals to the computer system. Once selected, the default microphone may be calibrated. Such a default microphone may be effective in capture sound, e.g., voices, but may not be the best microphone to use with a computer system in terms of an energy level and/or a signal-to-noise ratio.

In one embodiment, a substantially "best" microphone may be automatically calibrated and identified for use as a default microphone with a computer system, and/or with a particular application running on the computer system. By allowing a computer system, or an application running on the computer system, to automatically calibrate substantially all available microphones and to automatically determine which of the available microphones is the most suitable for use, the quality of audio signals provided to the computer system may be maintained at a relatively high level. A best microphone in terms of an energy level and/or a signal-to-noise ratio may be automatically selected for use in obtaining audio used by a computer system, or an application running on the computer system. In general, microphones are calibrated substantially while sound is captured on the microphones.

Figure 1:
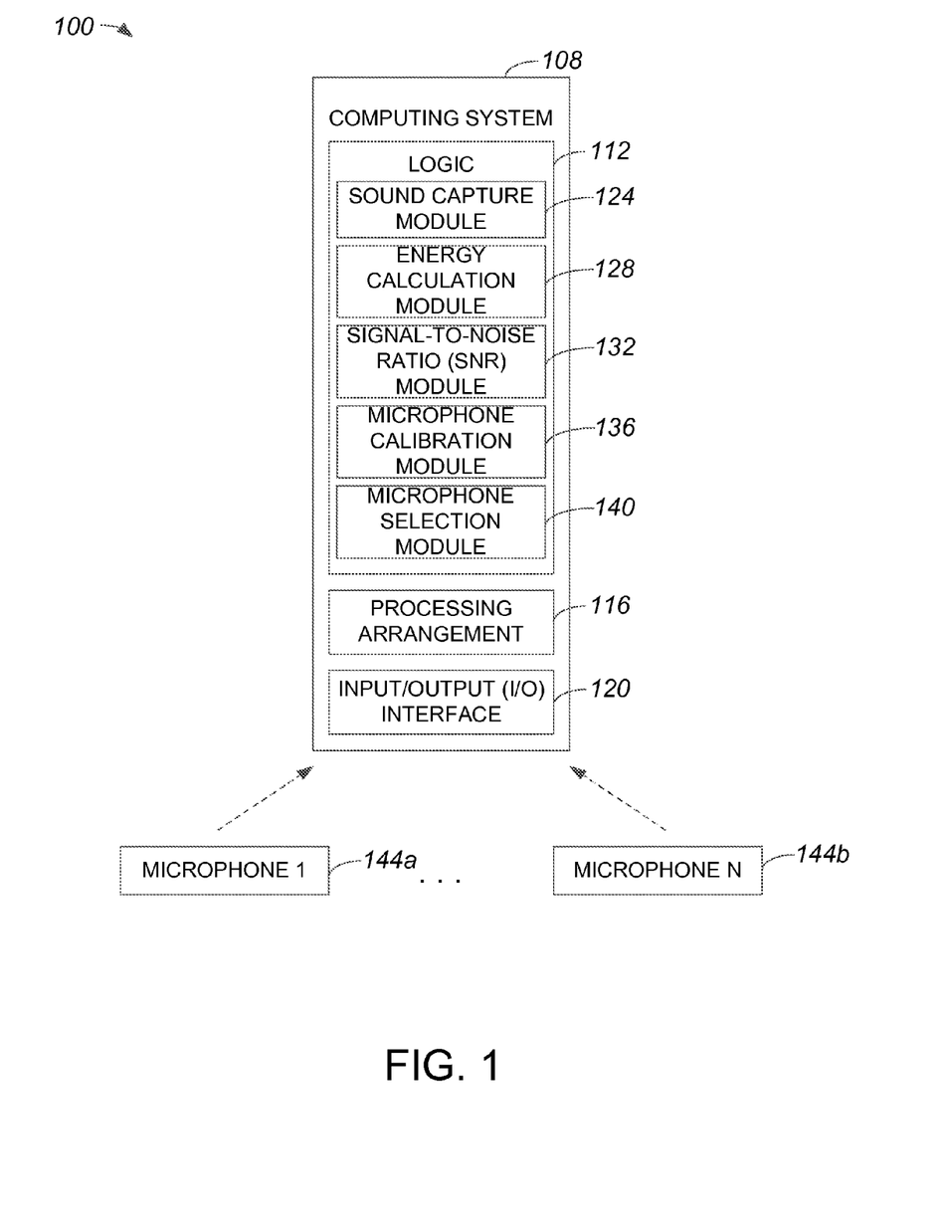
FIG. 1 is a diagrammatic representation of an overall system that includes a computing system and a plurality of microphones in accordance with an embodiment.

The criteria used to automatically identify a most suitable microphone from a plurality of microphones associated with a computer system may include energy levels, e.g., audio levels, associated with the microphones and signal-to-noise ratios associated with the microphones. Referring initially to FIG. 1, an overall system that includes a computing system and a plurality of microphones will be described in accordance with an embodiment. An overall system 100 includes a computing system 108 and a plurality of microphones 144a, 144b. It should be appreciated that although two microphones 144a, 144b are shown for ease of illustration, the number of microphones 144a, 144b is not limited to two and may vary widely. Microphones 144a, 144b are in communication with computer system 108 and may include, but are not limited to including, microphones associated with headset devices, webcam devices, and/or telephone devices.

Computing system 108 includes logic 112, a processing arrangement 116, and an input/output (I/O) interface 120. Logic 112 may include hardware and/or software logic that may be executed by processing arrangement 116. Processing arrangement 116 generally includes one or more processors, as for example microprocessors. I/O interface 120 allows computing system 108 to communicate with microphones 144a, 144b wirelessly and/or using wired connections, and may include at least one communications port (not shown).

Logic 112 includes a sound capture module 124 that is arranged to capture or otherwise obtain data from microphones 144a, 144b through I/O interface 120. Typically, sound capture module 124 may obtain an acoustic signal and/or acoustic energy through I/O interface 120. An energy calculation module 128 of logic 112 is configured to calculate or to identify the energy levels, as for example the electrical energy levels, associated with signals obtained by sound capture module 124.

A signal-to-noise ratio module 132, a microphone calibration module 136, and a microphone selection module 140. Signal-to-noise ratio module 132 is configured to calculate or to identify signal-to-noise ratios for signals obtained by sound capture module. Microphone calibration module 136 is generally arranged to process information relating to energy levels, obtained from energy calculation module 128, and information relating to signal-to-noise ratios, obtained from energy calculation module 128. Microphone calibration module 136 is generally also arranged to calibrate microphones 144a, 144b. Microphone selection module 140 is configured to identify one of microphones 144a, 144b as being the best, or generally most suitable, microphone for use in capturing sound for use by computing system 108. Using information provided by energy calculation module 128, signal-to-noise ratio module 132, and microphone calibration module 136, microphone selection module may automatically select one of microphones 144a, 144b as the best microphone for use with computing system 108 and cause computing system 108 to use the selected microphone 144a, 144b to capture sound. For example, if microphone 144a is selected as the best microphone for use with computing system 108, microphone selection module 140 may cause signals from microphone 144a to be used by computing system 108 while causing signals from microphone 144b to be substantially ignored by computing system 108.

In general, the automatic calibration and selection of a microphone may occur through the use of a software application arranged to lead a user through a series of steps to perform set-up associated with a computer, e.g., a software wizard, or may occur upon the initiation of an application that uses a microphone. A software wizard may allow a user to specify that a plurality of microphones is to be automatically calibrated, and that a preferred microphone for use is to be automatically selected from amongst the plurality of microphones. The initiation of an application such as a conferencing application or an Internet phone application may also cause a plurality of microphones to be automatically calibrated, and also cause a preferred microphone for use to be automatically selected from amongst the plurality of microphones.

Figure 2A:
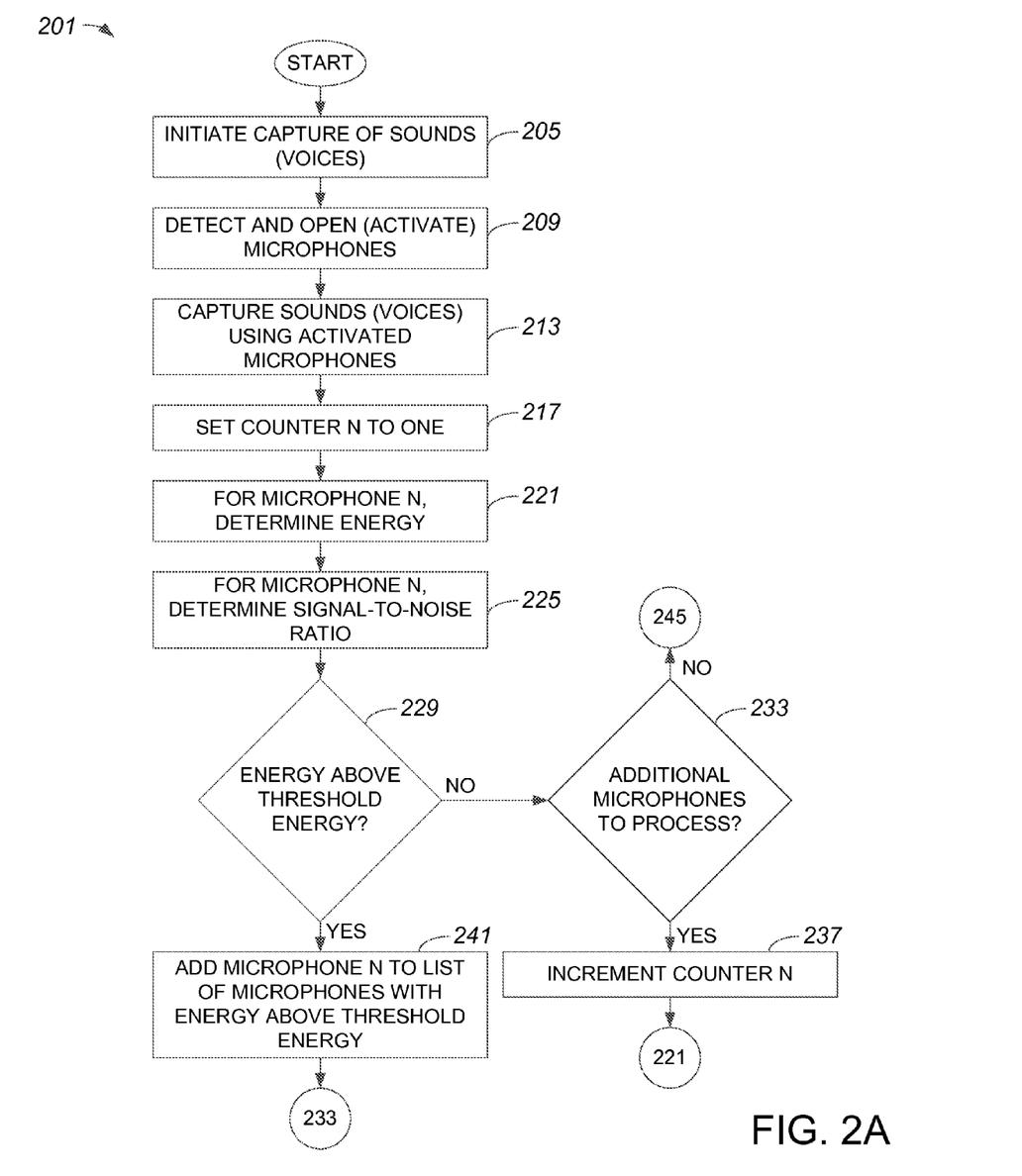
FIGS. 2A-C are a process flow diagram which illustrates a method of operating a software wizard which automatically calibrates a plurality of microphones and selects a best microphone for use with a computing system in accordance with an embodiment.
Figure 2B:
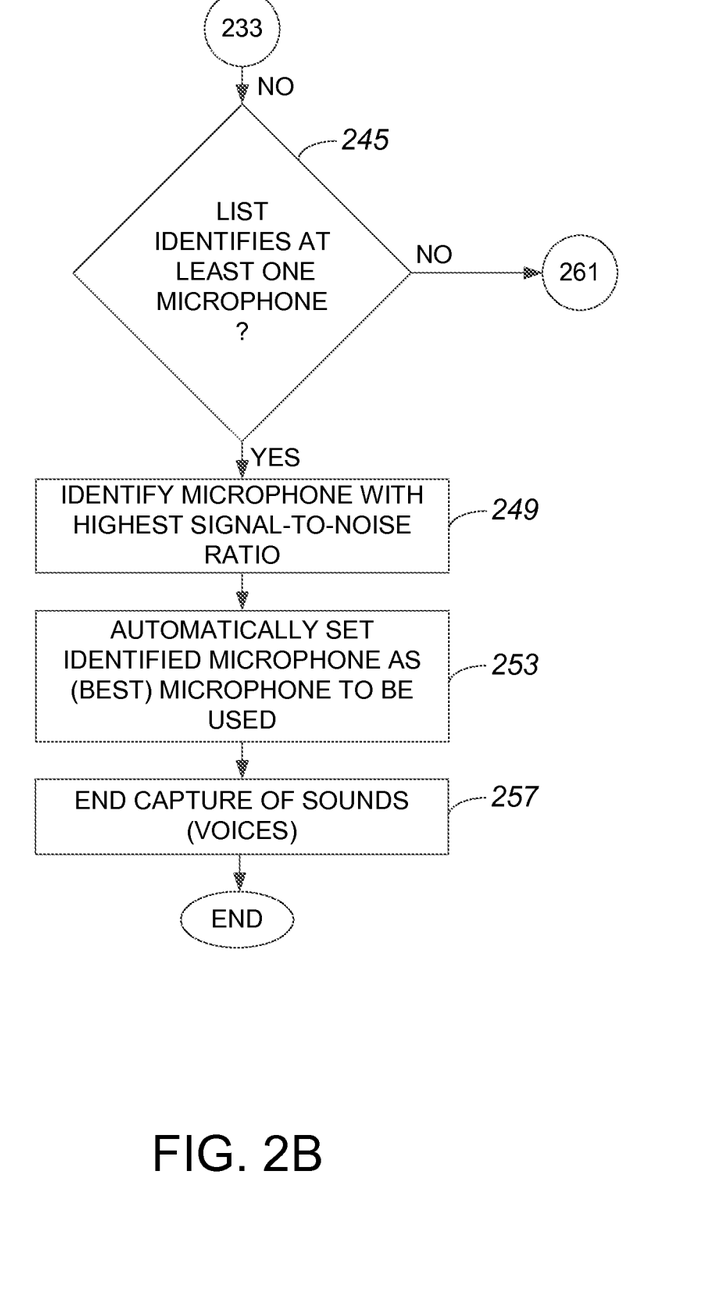
Figure 2C:
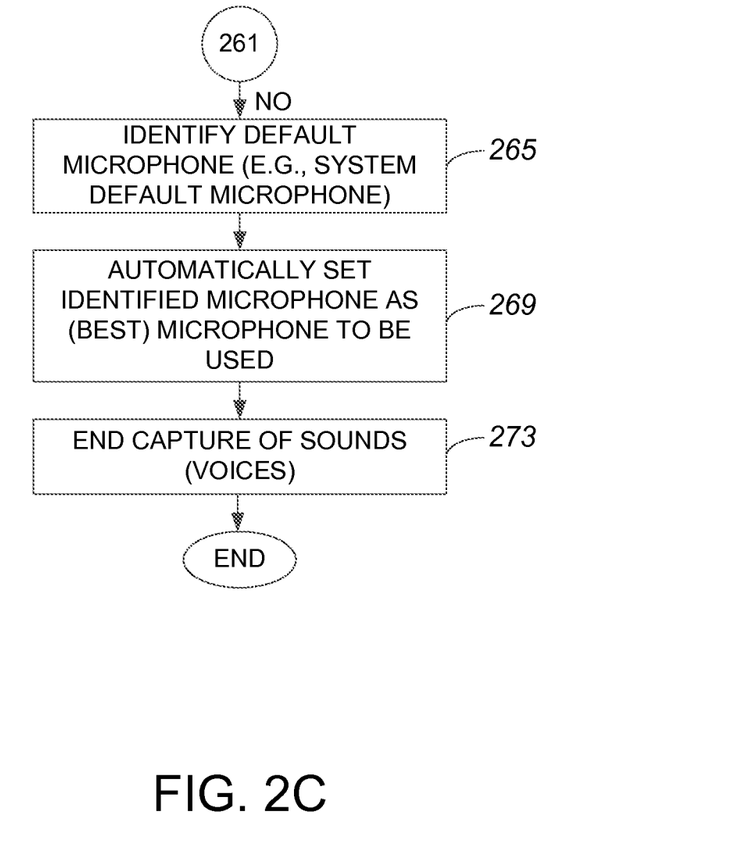

FIGS. 2A-C are a process flow diagram which illustrates a method of utilizing a software wizard to automatically calibrate a plurality of microphones and selects a best microphone for use with a computing system in accordance with an embodiment. A process 201 of automatically calibrating and selecting a best microphone for use begins at step 205 in which that capture of sounds, e.g., voices, is initiated. In one embodiment, the capture of sounds is initiated when a user issues a command through a software wizard.

Once the capture of sounds is initiated, the software wizard may detect the presence of microphones and open, e.g., activate, the microphones in step 209. The microphones may include substantially all microphones associated with, e.g., in communication with, a computer system on which the software wizard is executing. In step 213, sounds may be captured using the activated microphones. In one embodiment, a user may be prompted to speak a string of words while the sounds are captured by the activated microphones. It should be appreciated that sound may be captured by the activated microphones substantially simultaneously. The captured sounds are generally used to calibrate the microphones. It should be appreciated that an overall process of calibrating microphones may effectively be associated with at least steps 213, 217, 221, and 225.

After sounds are captured and microphones are substantially calibrated, a counter "N" is initiated, e.g., set to a value of one, in step 217. For microphone "N," an energy level is determined in step 221. The energy level may be an electrical energy level that is outputted by microphone "N" in response to the captured sounds. As will be appreciated by those skilled in the art, acoustical energy associated with the captured sounds is generally converted into electrical energy by microphone "N." In one embodiment, an energy level may be an audio level, and a voice energy may be considered to be a magnitude of an audio level.

Once the energy level for microphone "N" is determined, process flow moves to step 225 in which a signal-to-noise ratio for microphone "N" is determined. The signal-to-noise ratio may be determined using any suitable method. In one embodiment, a spectral signal-to-noise ratio may be determined.

In step 229, a determination is made as to whether the energy level for microphone "N" is above a threshold energy level. The threshold energy level may effectively be a minimum energy level that is considered to be acceptable. If the determination is that the energy level for microphone "N" is above the threshold energy level, then the indication is that microphone "N" is potentially the best microphone for use. As such, process flow moves from step 229 to step 241 in which microphone "N" is added to a list of microphones with an energy level that is above the threshold energy level. After microphone "N" is added to the list of microphones with an energy level above the threshold energy level, process flow process to step 233 in which it is determined whether there are additional microphones to process. That is, it is determined in step 233 whether all activated microphones have been processed.

If the determination in step 233 is that there are additional microphones to process, the counter "N" is incremented in step 237. Upon incrementing counter "N," process flow returns to step 221 in which an energy level is determined for microphone "N." Alternatively, if the determination in step 233 is that there are no additional microphones to process, then process flow moves to step 245 in which it is determined if the list of microphones with an energy level above the threshold energy level identifies at least one microphone.

If it is determined in step 245 that the list identifies at least one microphone, the implication is that there is at least one microphone which has an energy level that is above the threshold energy level. Accordingly, in step 249, the microphone which has the highest signal-to-noise ratio is identified from the list. The identified microphone is set in step 253 as the best microphone, or the microphone to be used. Once the microphone to be used is set, the capture of sounds using the activated microphones may be ended in step 257. It should be appreciated that the capture of sounds as a part of a process of automatically calibrating and selecting a best microphone to be used may end at substantially any time. In the described embodiment, after the capture of sounds is ended in step 257, the process of automatically calibrating and selecting a best microphone to be used is completed.

Returning to step 245, if it is determined that the list of microphones with an energy level above the threshold energy level does not identify at least one microphone, the implication is that none of the detected microphones has an energy level above the threshold energy level. As such, process flow moves from step 245 to step 261 in which a default microphone is identified. It should be appreciated although none of the microphones has an energy level above the threshold energy level, e.g., an acceptable energy level, it may generally be necessary to identify a microphone for use. In the described embodiment, a microphone identified as a default microphone or a system default microphone may be identified.

In step 269, the microphone identified in step 265 is automatically set as the microphone to be used, e.g., as the best microphone. Then, the capture of sounds is ended in step 273. Upon ending the capture of sounds, the process of automatically calibrating and selecting a best microphone to be used is completed.

Returning to step 229 and the determination of whether the energy level of microphone "N" is above the threshold energy level, if the determination is that the energy level of microphone "N" is not above the threshold energy level, the indication is that microphone "N" is not likely to be identified as the best microphone for use. Accordingly, microphone "N" is not added to the list of microphones with an energy level that is above the threshold energy level, and process flow moves from step 229 to step 233 in which it is determined whether there are additional microphones to process.

Figure 3A:
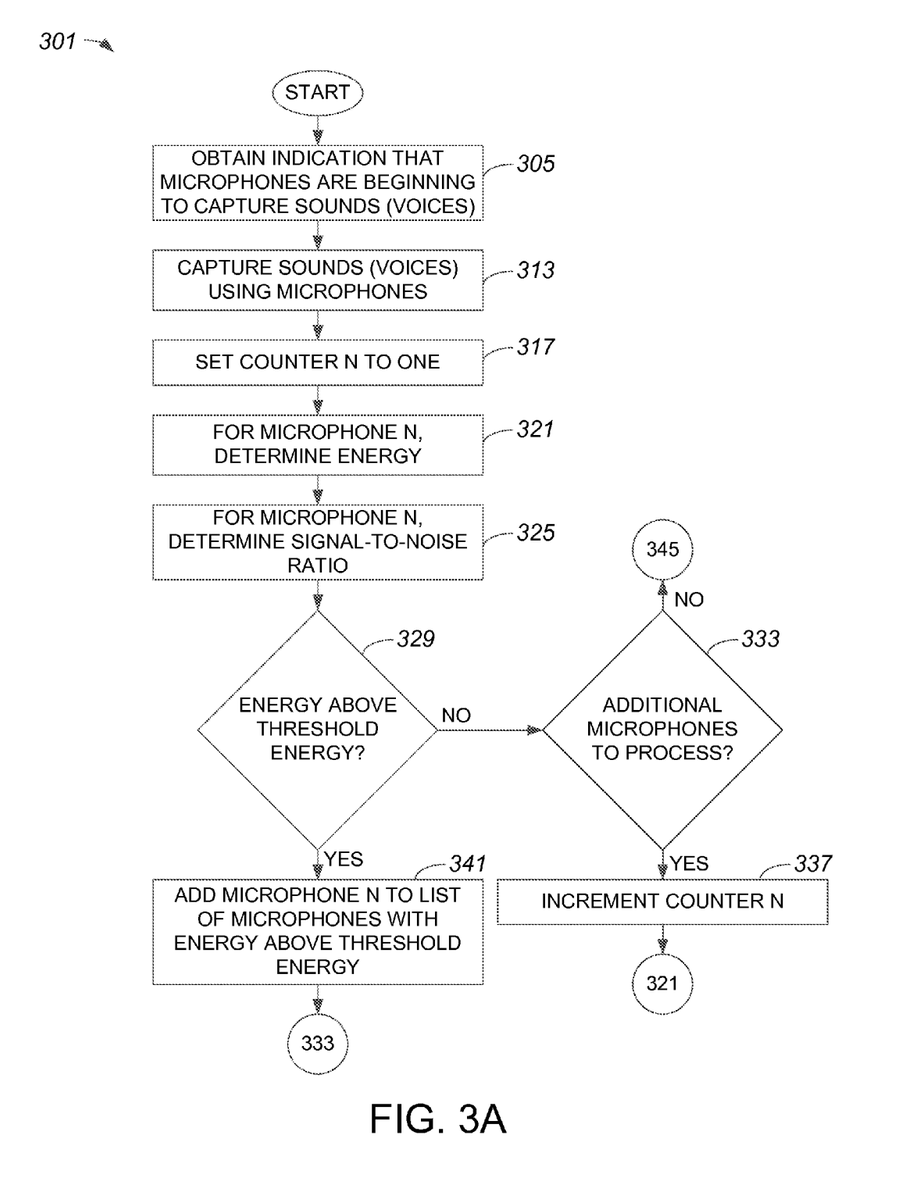
FIGS. 3A-C are a process flow diagram which illustrates a method of automatically calibrating a plurality of microphones and selecting a best microphone for use with a computing system when the microphones begin to capture sound, e.g., when a voice application is activated, in accordance with an embodiment.
Figure 3B:
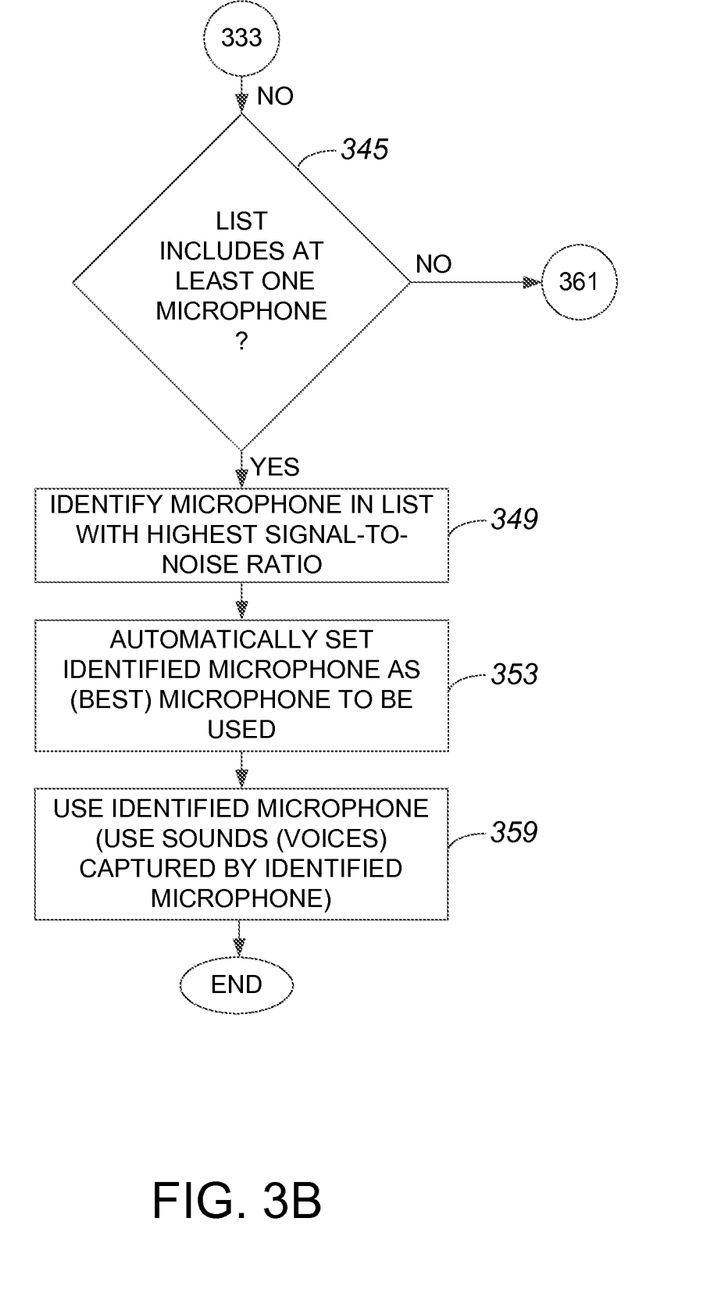
Figure 3C:
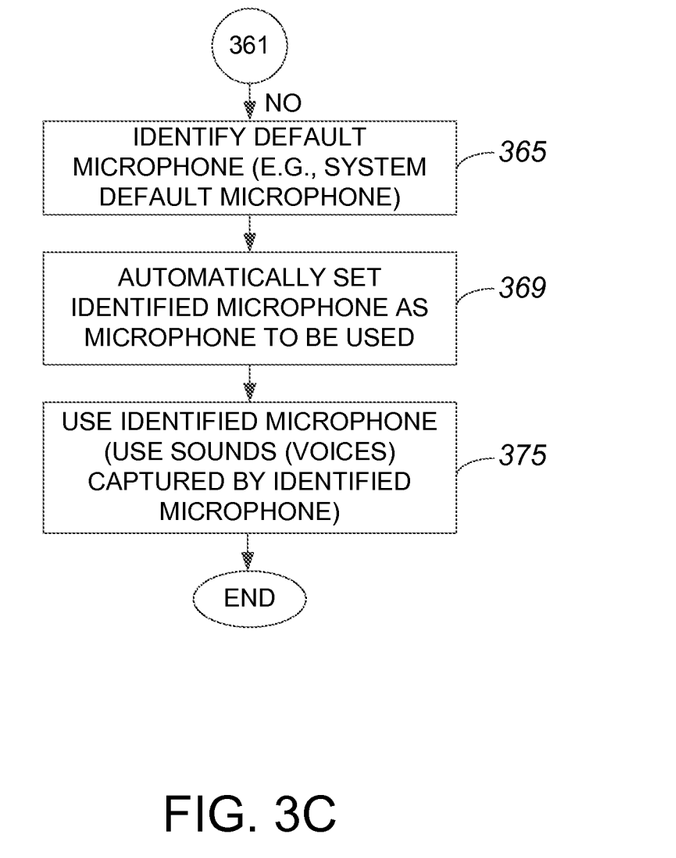

As previously mentioned, an automatic calibration and selection process that identifies a preferred microphone may be initiated when an application that uses a microphone begins to execute. By way of example, when a teleconference application begins to execute, an automatic calibration and selection process may be initiated once the teleconference application begins to capture sounds on at least one microphone. With reference to FIGS. 3A-C, a method of automatically calibrating a plurality of microphones and selecting a best microphone for use with a computing system when the microphones begin to capture sound, e.g., when a voice application is activated, will be described in accordance with an embodiment. A process 301 of automatically calibrating a plurality of microphones and selecting a best microphone from the plurality of microphones begins at step 305 in which an indication that at least one microphone is beginning to capture sounds, e.g., voices, is obtained. The indication is obtained while an application, e.g., a teleconference or phone application, which uses a microphone to capture sounds is executing.

After the indication that at least one microphone is beginning to capture sounds is obtained, sound is captured by substantially all open or activated microphones in step 313. It should be appreciated that sound may be captured by the activated microphones, and the microphones may be calibrated, substantially simultaneously. In one embodiment, when not all microphones are identified as beginning to capture sound in step 305, the application may cause substantially all microphones to be opened or activated such that sound may be captured in step 313.

A counter "N" is initiated, e.g., set to a value of one, in step 317. For microphone "N," an energy level is determined in step 321. The energy level may be an electrical energy level that is outputted by microphone "N" in response to the captured sounds. Once the energy level for microphone "N" is determined, process flow moves to step 325 in which a signal-to-noise ratio for microphone "N" is determined. The signal-to-noise ratio may be determined using any suitable method.

A determination is made in step 329 as to whether the energy level for microphone "N" is above a threshold energy level. If the determination is that the energy level for microphone "N" is above the threshold energy level, then the indication is that microphone "N" is effectively a candidate for the best microphone to use. Accordingly, process flow moves from step 329 to step 341 in which microphone "N" is added to a list of microphones with an energy level that is above the threshold energy level. Once microphone "N" is added to the list of microphones with an energy level above the threshold energy level, process flow process to step 333 in which it is determined whether there are additional microphones to process.

If the determination in step 333 is that there are additional microphones to process, the counter "N" is incremented in step 337. After incrementing counter "N," process flow returns to step 321 in which an energy level is determined for microphone "N." Alternatively, if the determination in step 333 is that there are no additional microphones to process, then process flow moves to step 345 in which it is determined if the list of microphones with an energy level above the threshold energy level identifies at least one microphone. That is, it is determined whether there are any microphones with an energy level that is above the threshold energy level.

If it is determined in step 345 that the list identifies at least one microphone, the microphone which has the highest signal-to-noise ratio is identified from the list is identified in step 349. The identified microphone is set in step 353 as the best microphone, or the microphone to be used by the application. Once the microphone to be used is set, the identified microphone is used by the application in step 359 to capture sounds. It should be appreciated that signals from identified microphone may be used by the application, while signals from other microphones may be substantially ignored by the application. In one embodiment, substantially all microphones other than the best microphone may be closed or otherwise deactivated such that the best microphone may capture sounds while other microphones do not capture sounds while the application is executing. The process of automatically calibrating and selecting a best microphone to be used is completed once the identified microphone is in use.

Returning to step 345, if it is determined that the list of microphones with an energy level above the threshold energy level does not identify at least one microphone, the implication is that none of the detected microphones has an energy level above the threshold energy level. As such, process flow moves from step 345 to step 361 in which a default microphone is identified. It should be appreciated although none of the microphones has an energy level above the threshold energy level, e.g., an acceptable energy level, it may generally be necessary to identify a microphone for use. In the described embodiment, a system default microphone, or a microphone that is substantially predetermined to be a suitable microphone to use when none of the microphones has an energy level above the threshold energy level, may be a microphone that a user has previously identified.

In step 369, the microphone identified in step 365 is automatically set as the microphone to be used, e.g., as the best microphone. The best microphone is then used to capture sounds in step 375, and the sounds capture by the best microphone are used by the application. The process of automatically calibrating and selecting a best microphone to be used is then completed.

Returning to step 329 and the determination of whether the energy level of microphone "N" is above the threshold energy level, if the determination is that the energy level of microphone "N" is not above the threshold energy level, the indication is that microphone "N" is not likely to be identified as the best microphone for use. Accordingly, microphone "N" is not added to the list of microphones with an energy level that is above the threshold energy level, and process flow moves from step 329 to step 333 in which it is determined whether there are additional microphones to process.

Figure 4:
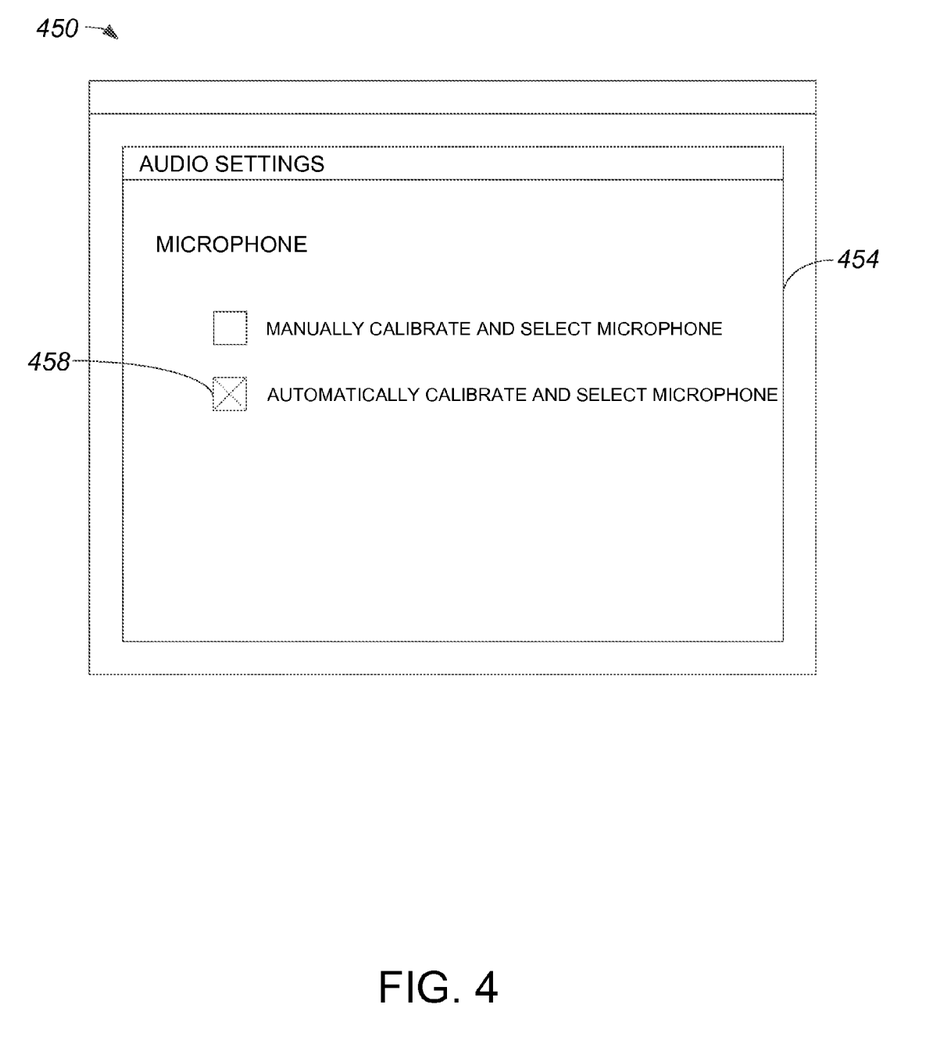
FIG. 4 is a diagrammatic representation of a user interface which allows a user to allow for the automatic calibration and selection of a desired microphone in accordance with an embodiment.

In one embodiment, a user of a computing system may effectively specify that the computing system is to automatically calibrate microphones and to automatically select a microphone, e.g., a best microphone, for use by the computing system. FIG. 4 is a diagrammatic representation of a user interface which allows a user to allow for the automatic calibration and selection of a desired microphone in accordance with an embodiment. A window 450, e.g., a window displayed on a display screen of a computer system, includes a user interface 454 that allows a user to select an option 458 which allows a microphone to be automatically calibrated and selected. As shown, a user also has an option of manually calibrating and selecting a microphone.

Although only a few embodiments have been described in this disclosure, it should be understood that the disclosure may be embodied in many other specific forms without departing from the spirit or the scope of the present disclosure. By way of example, a best microphone for use is generally described as a microphone with a highest signal-to-noise ratio of a group of microphones that has an acceptable energy level. A best microphone for use is, however not limited to being a microphone with the highest signal-to-noise ratio of a group of microphones. A best microphone for use may be, for instance, a microphone with a highest energy level of a group of microphones.

In one embodiment, a best microphone for use may be identified as a microphone with the best combination of an energy level and a signal-to-noise ratio. A best combination of an energy level and a signal-to-noise ratio may be determined using any suitable criteria. For example, a microphone with the best combination of an energy level and a signal-to-noise ratio may be determined by ranking a plurality of microphones in terms of energy levels and signal-to-noise ratios. After ranking the plurality of microphones, the microphone which has the best combination of rankings in terms of energy levels and signal-to-noise ratios may be identified as the best microphone. The best microphone may not be either a microphone with the highest energy level or a microphone with the highest signal-to-noise ratio. For instance, criteria used to determine a best combination of rankings in terms of energy levels and signal-to-noise rations may be such that a microphone with less than the highest energy level and less than the highest signal-to-noise ratio is identified as the best microphone. It should be appreciated that criteria used to identify the best microphone may vary without departing from the spirit or the scope of the disclosure.

In one embodiment, a user of a computing system may specify at least one criterion which is to be used to automatically identify a best, or most suitable, microphone for use by the computing system to capture sounds. A user may also specify a threshold energy level, as well as a threshold signal-to-noise ratio. By way of example, for an embodiment in which a best microphone is expected to exceed a threshold energy level and a threshold signal-to-noise ratio, a user may specify the thresholds.

As described above, a best microphone for use may be automatically selected whenever a software wizard is activated, or whenever an application which uses a microphone is initiated. It should be appreciated that the identification of a best microphone may be updated dynamically in some instances. That is, after a best microphone is identified at a first time from amongst a group of microphones, the group of microphones may be re-calibrated, and it may be determined whether another microphone is currently better than the best microphone identified at the first time. It should be appreciated that periodic calibration may be most appropriate in some cases and not in other cases. For example, period calibration may be appropriate when substantially all microphones have passed an energy level threshold. In one embodiment, if a system with multiple microphones detects a new available microphone is available, the system may effectively re-initiate a process of automatically calibrating and identifying a best microphone, or may display a message which allows a user to elect to identify a new best microphone. In another embodiment, a system may be configured to periodically re-initiate a process of automatically calibrating and identifying a best microphone using a software wizard when all microphones have passed an energy or audio level threshold.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   capturing sound using a plurality of microphones, wherein the plurality of microphones is associated with a computing system;
   determining energy levels for the plurality of microphones;
   determining signal-to-noise ratios (SNRs) for the plurality of microphones; and
   selecting a particular microphone of the plurality of microphones based on the energy levels and the SNRs, wherein selecting the particular microphone includes providing audio signals obtained by the particular microphone to the computing system for use.

2. The method of claim 1 wherein the plurality of microphones includes at least a first microphone and a second microphone, and wherein determining the energy levels for the plurality of microphones includes determining a first energy level associated with the first microphone using the captured sound and determining a second energy level associated with the second microphone using the captured sound.

3. The method of claim 2 further including:
determining whether the first energy level exceeds a threshold energy level; and
determining whether the second energy level exceeds the threshold energy level, wherein when it is determined that the first energy level exceeds the threshold energy level and when it is determined that the second energy level does not exceed the threshold energy level, the first microphone is selected as the particular microphone.

4. The method of claim 3 wherein determining the SNRs for the plurality of microphones includes determining a first SNR associated with the first microphone using the captured sound, and determining a second SNR associated with the second microphone using the captured sound.

5. The method of claim 4 wherein when it is determined that the first energy level exceeds the threshold level and when it is determined that the second energy level exceeds the threshold level, the method further includes:
determining when the first SNR is greater than the second SNR, wherein the first microphone is automatically selected as the particular microphone when it is determined that the first SNR is greater than the second SNR, and wherein the second microphone is selected as the particular microphone when it is determined that the first SNR is not greater than the second SNR.

6. The method of claim 1 wherein capturing the sound using the plurality of microphones includes calibrating the plurality of microphones, the plurality of microphones including a first microphone and a second microphone, wherein selecting the particular microphone includes selecting the first microphone as the particular microphone when the first microphone has more than a threshold energy level and the first microphone has a higher SNR than the second microphone.

7. The method of claim 1 further including:
initiating an application, the application being a conferencing application, the application being arranged to execute on the computing system, wherein initiating the application includes capturing the sound using the plurality of microphones.

8. The method of claim 1 further including:
activating the plurality of microphones.

9. A tangible, non-transitory computer-readable medium comprising computer program code, the computer program code, when executed, configured to:
capture sound using a plurality of microphones, wherein the plurality of microphones is associated with a computing system;
determine energy levels for the plurality of microphones;
determine signal-to-noise ratios (SNRs) for the plurality of microphones; and
select a particular microphone of the plurality of microphones based on the energy levels and the SNRs, wherein the computer program code configured to select the particular microphone includes computer code configured to provide audio signals obtained by the particular microphone to the computing system for use.

10. The tangible, non-transitory computer-readable medium comprising computer program code of claim 9 wherein the plurality of microphones includes at least a first microphone and a second microphone, and wherein the computer program code configured to determine the energy levels for the plurality of microphones includes computer program code configured to determine a first energy level associated with the first microphone using the captured sound and computer program code configured to determine a second energy level associated with the second microphone using the captured sound.

11. The tangible, non-transitory computer-readable medium comprising computer program code of claim 10, wherein the computer program code is further configured to:
determine whether the first energy level exceeds a threshold energy level; and
determine whether the second energy level exceeds the threshold energy level, wherein when it is determined that the first energy level exceeds the threshold energy level and when it is determined that the second energy level does not exceed the threshold energy level, the first microphone is automatically selected as the particular microphone.

12. The tangible, non-transitory computer-readable medium comprising computer program code of claim 11 wherein the computer program code configured to determine the SNRs for the plurality of microphones includes computer program code configured to determine a first SNR associated with the first microphone using the captured sound, and computer program code configured to determine a second SNR associated with the second microphone using the captured sound.

13. The tangible, non-transitory computer-readable medium comprising computer program code of claim 12 wherein when it is determined that the first energy level exceeds the threshold level and when it is determined that the second energy level exceeds the threshold level, the computer program code is further configured to:
determine when the first SNR is greater than the second SNR, wherein the first microphone is selected as the particular microphone and the second microphone is deactivated when it is determined that the first SNR is greater than the second SNR, and wherein the second microphone is selected as the particular microphone and the first microphone is deactivated when it is determined that the first SNR is not greater than the second SNR.

14. The tangible, non-transitory computer-readable medium comprising computer program code of claim 9 wherein the computer program code configured to capture the sound using the plurality of microphones includes computer program code configured to calibrate the plurality of microphones.

15. The tangible, non-transitory computer-readable medium comprising computer program code of claim 9, wherein the computer program code is further configured to:
initiate an application, the application being arranged to execute on the computing system, wherein the computer program code configured to initiate the application includes the computer program code to capture the sound using the plurality of microphones.

16. An apparatus comprising:
a plurality of microphones, the plurality of microphones being arranged to capture sound; and
a system, the system being in communication with the plurality of microphones, the system being configured to determine energy levels associated with the sound captured by the plurality of microphones and signal-to-noise ratios (SNRs) associated with the sound captured by the plurality of microphones, wherein the system is further configured to automatically select a particular microphone from the plurality of microphones based on the energy levels and the SNRs for use in providing audio signals to the system.

17. The apparatus of claim 16 wherein the plurality of microphones includes a first microphone and a second microphone, the first microphone having a first energy level and a first SNR, the second microphone having a second energy level and a second SNR, and wherein the system is configured to automatically select the first microphone as the particular microphone when the first energy level is higher than a threshold energy level, the second energy level is higher than the threshold energy level, and the first SNR that is greater than the second SNR.

18. The apparatus of claim 16 wherein the plurality of microphones includes a first microphone and a second microphone, the first microphone having a first SNR, the second microphone having a second SNR, and wherein the system is configured to automatically select the first microphone as the particular microphone when the first SNR that is greater than the second SNR and to deactivate the second microphone when the first microphone is automatically selected as a first microphone.

19. The apparatus of claim 16 wherein the system is further configured to calibrate the plurality of microphones substantially simultaneously, wherein the plurality of microphones is arranged to capture the sound substantially simultaneously.

20. The apparatus of claim 16 wherein the system is arranged to initiate an application that is arranged to use the audio signals, and wherein the system is further configured to activate the plurality of microphones when the application is initiated.

* * * * *